US009864670B2

(12) United States Patent
Arndt

(10) Patent No.: US 9,864,670 B2
(45) Date of Patent: Jan. 9, 2018

(54) DYNAMICALLY CHOOSING DATA TO COLLECT IN A SYSTEM

(71) Applicant: International Business Machines Corporation, Armonk, NY (US)

(72) Inventor: Karla K. Arndt, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

(21) Appl. No.: 14/687,630

(22) Filed: Apr. 15, 2015

(65) Prior Publication Data

US 2016/0306669 A1 Oct. 20, 2016

(51) Int. Cl.

*G06F 9/46* (2006.01)
*G06F 11/34* (2006.01)
*G06F 11/00* (2006.01)
*G06F 9/50* (2006.01)

(52) U.S. Cl.

CPC .............. *G06F 11/34* (2013.01); *G06F 11/00* (2013.01); *G06F 9/5016* (2013.01); *G06F 9/5038* (2013.01)

(58) Field of Classification Search

CPC ............................. G06F 9/5038; G06F 9/5016
See application file for complete search history.

(56) References Cited

U.S. PATENT DOCUMENTS 6,801,940 B1 * 10/2004 Moran .................... H04L 47/10 370/230
7,673,191 B2 * 3/2010 Addleman .......... G06F 11/0709 714/47.2
7,676,706 B2 * 3/2010 Addleman .......... G06F 11/3419 714/47.2
8,141,051 B2 * 3/2012 Huang ................ G06F 11/3409 717/127
8,346,743 B2 1/2013 Pfuntner et al.
8,793,694 B2 7/2014 Jackson et al.
2002/0184065 A1 * 12/2002 Menard .................. G06Q 30/06 709/224
2003/0236801 A1 * 12/2003 LeCrone ............... G06F 3/0601
2007/0094281 A1 * 4/2007 Malloy .................. G06Q 10/06
2008/0097801 A1 * 4/2008 MacLellan .......... G06F 11/3409 709/224
2008/0162272 A1 * 7/2008 Huang ................ G06F 11/3409 717/127
2008/0306711 A1 * 12/2008 Bansal ................ G06F 11/3419 702/182
2009/0070457 A1 * 3/2009 McKinney .............. G06F 9/505 709/224

(Continued)

OTHER PUBLICATIONS

Cisco MDS 9000 Family NX-OS System Management Configuration Guide—Configuring RMON, 3 pages, retrieved Jan. 2, 2015, <http://www.cisco.com/c/en/us/td/docs/switches/datacenter/mds9000/sw/5_0/configuration/guides/sysmgnt/nxos/sysmgmt_cli/rmon.html>.

(Continued)

*Primary Examiner* — James J Lee
(74) *Attorney, Agent, or Firm* — Patterson + Sheridan, LLP

(57) ABSTRACT

Systems, methods, and computer program products to perform an operation comprising collecting, metric data for a first job upon determining that the first job: uses a first resource of a computing system at a level that exceeds a first threshold, wherein the metric data describes a usage level of the first resource by the first job, and has been executing for a duration of time that exceeds a time threshold.

15 Claims, 3 Drawing Sheets

200

START
BOOT SYSTEM AND START JOBS — 210
CONFIGURE PFA MODULE AND RELATED SETTINGS — 220
START PREDICTIVE FAILURE ANALYSIS MODULE — 230
DETERMINE, BY PFA WHETHER TO COLLECT DATA FOR JOBS — 240
STORE ANY COLLECTED DATA — 250
LEVERAGE COLLECTED DATA TO PREDICT WHETHER A SYSTEM FAILURE MAY OCCUR — 260
END

(56) References Cited

U.S. PATENT DOCUMENTS

| | | | | |
|---|---|---|---|---|
| 2011/0016207 | A1* | 1/2011 | Goulet | G06Q 10/06 709/224 |
| 2011/0209158 | A1* | 8/2011 | Paul | G06F 9/30076 718/108 |
| 2011/0276840 | A1* | 11/2011 | Fresson | G06F 11/076 714/47.2 |
| 2011/0314203 | A1* | 12/2011 | Chen | G06F 9/45558 711/6 |
| 2013/0185601 | A1* | 7/2013 | Mayer | G06F 11/3636 714/45 |
| 2014/0013310 | A1 | 1/2014 | Crosby | |
| 2014/0146648 | A1* | 5/2014 | Alber | G11B 27/002 369/53.1 |
| 2014/0317605 | A1* | 10/2014 | Gataullin | G06F 11/3636 717/128 |
| 2015/0212855 | A1* | 7/2015 | Klee | G06F 9/50 718/104 |
| 2016/0266998 | A1* | 9/2016 | Gautallin | G06F 11/3466 |

OTHER PUBLICATIONS

Abadi et al., "REED: Robust, Efficient Filtering and Event Detection in Sensor Networks," pp. 1-14, VLDB '05 Proceedings of the 31st International Cconference on Very Large Data Bases, 2005.

Yin et al., "Spatio-Temporal Event Detection Using Dynamic Conditional Random Fields," pp. 1-6, Proceedings of the Twenty-First International Joint Conference on Artificial Intelligence (IJCAI-09), 2009.

"Survey of Software Monitoring and Profiling Tools", 12 pages, retrieved Apr. 15, 2015, <http://www.cs.wustl.edu/~jain/cse567-06/ftp/sw_monitors2/index.html>.

"HP Performance Engineering Best Practices Series for Performance Engineers and Managers," May 2009, 248 pages, <https://www.sqa.its.state.nc.us/library/pdf/HP%20Performance%20Monitoring%20Best%20Practices.pdf>.

Karla K. Arndt, "Dynamically Choosing Data to Collect in a System", U.S. Appl. No. 14/727,272, filed Jun. 1, 2015.

IBM "List of IBM Patents or Patent Applications Treated As Related".

* cited by examiner

DYNAMICALLY CHOOSING DATA TO COLLECT IN A SYSTEM

BACKGROUND

The present invention relates to data collection in a computing system, and more specifically, to dynamically choosing what data to collect about applications programs running on the computing system to monitor system health or performance.

Software monitors may track system health and/or system performance. One well known problem with software monitors is that collecting the data required to diagnose or predict a problem can be costly in both the time required to collect the data as well as the amount of storage needed to store the collected data. For example, collecting too much data may lead to system performance and storage issues at both data collection and problem determination times. Similarly, collecting too little data may lead to inaccurate analysis and diagnostic misses. In addition, collecting the right amount of data, but not the right data needed to correctly diagnose a given problem may lead to inaccurate analysis and possibly allow problems to go unidentified. Users often do not know what to monitor, which then causes the collection of too much or too little data. In addition, when the user changes the collection policy, these changes must be manually propagated to the system monitors.

SUMMARY

In one embodiment, a system comprises a processor and a memory containing a program configured to perform an operation comprising collecting metric data for a first job upon determining that the first job: uses a first resource of the system at a level that exceeds a first threshold, wherein the metric data describes a usage level of the first resource by the first job, and has been executing for a duration of time that exceeds a time threshold.

In another embodiment, a method comprises collecting metric data for a first job upon determining that the first job: uses a first resource of a computing system at a level that exceeds a first threshold, wherein the metric data describes a usage level of the first resource by the first job, and has been executing for a duration of time that exceeds a time threshold.

In another embodiment, a computer program product comprises computer-readable program code, which when executed by a processor, performs an operation comprising collecting metric data for a first job upon determining that the first job: uses a first resource of a computing system at a level that exceeds a first threshold, wherein the metric data describes a usage level of the first resource by the first job, and has been executing for a duration of time that exceeds a time threshold.

DETAILED DESCRIPTION

Figure 1:
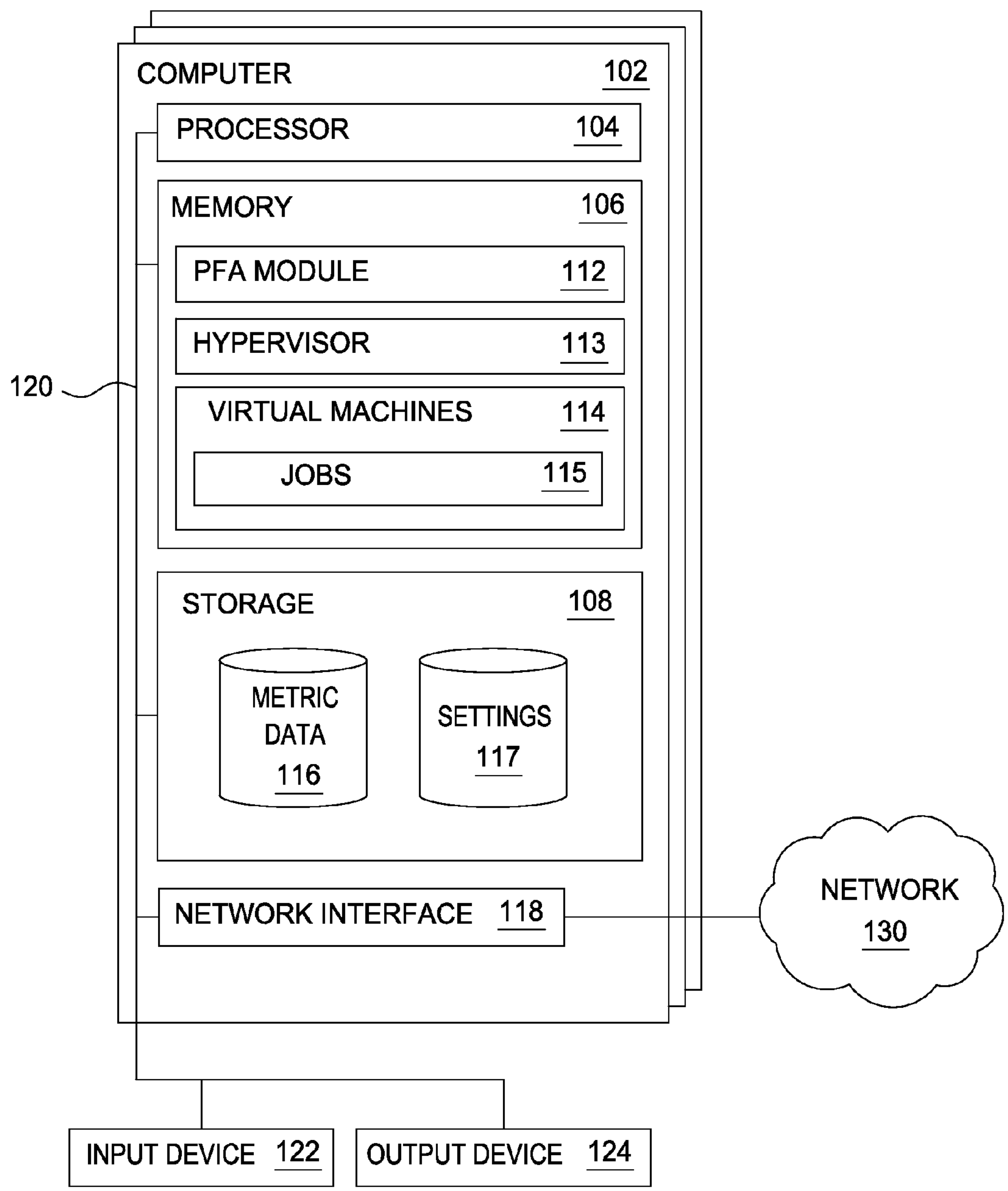
FIG. 1 illustrates a system configured to dynamically choose data for data collection, according to one embodiment.

Embodiments disclosed herein provide techniques to dynamically collect data from a set of programs and applications without the need to configure or instrument the applications. More specifically, embodiments disclosed herein collect data from jobs (also referred to as applications, programs, address spaces, processes, and the like) that may cause system issues and are reasonably persistent (as opposed to those jobs that are transient). In addition, embodiments disclosed herein may dynamically limit the amount of data collected by the software monitor by not collecting information from jobs that do not use significant amounts of the resource metric being collected (or not collecting information from jobs that have a rate of a metric being monitored that is insignificant). Stated differently, embodiments disclosed herein evaluate both the duration of a job (i.e., persistent jobs) and the job's use of resources (or rate of a monitored metric) to determine a set of jobs that has the potential to cause system issues relative to the metric being collected (such as memory use, processor use, storage use, rate of messages, rates of logged data, etc). In addition, embodiments disclosed herein may monitor two types of resources for jobs. The first type of resource may be the actual resources being used by a job (or predicted future resource usage by the job), such as memory, CPU, storage, and the like. The second type of resource may be the rate of a metric that can be monitored for abnormalities, such as the rate of messages sent by a job, the rate of logged data, the rate of failure records for a job, and the like. The second type of resource usage may be monitored for abnormal rates (too high or too low) that can indicate failures that can lead to job issues and system outages.

Generally, embodiments disclosed herein may generally collect data from a job when the job satisfies two criteria. First, the amount of time a given job has been running needs to satisfy a duration test (defined by a threshold amount of time) and second, the job utilizes an amount of resources that satisfies a utilization test (defined by a threshold percentage or amount of resource usage). For example, embodiments disclosed herein skip collecting metric data for a job that passes the duration test but fails the utilization test (i.e., the job does not consume a threshold amount of resources). However, if the job's resource utilization increases beyond the threshold, the software monitor may start collecting metric data for the job, limiting collection to those jobs whose resource utilization is significant. In addition, if the resource utilization subsequently decreases below the threshold (or lower), embodiments disclosed herein may stop collecting metric data for the job. However, once the resource utilization threshold is met, the software monitor may wait until the resource utilization falls below a second threshold, to avoid starting/stopping the collection when resource utilization fluctuates around the initial threshold.

Furthermore, in one embodiment, metric data may be collected for a system-related job that does not pass the duration test but passes the utilization test. That is, the duration requirement may be ignored for those jobs that are initially assumed to be system-related. System-related jobs include, for example and without limitation, jobs that start during initial program load, or within a threshold amount of time of system startup, or jobs explicitly marked as being system related by either the system itself or by a user (e.g., a system operator).

The duration and utilization thresholds may be user-configurable thresholds. For example, the duration threshold may specify that a job must run for three hours before passing the duration test, while the utilization threshold may specify that a job must utilize at least 20% of a resource before the job passes the utilization test.

FIG. 1 illustrates a system 100 configured to dynamically choose data for data collection, according to one embodiment. The system 100 includes one or more computers 102 connected to other computers via a network 130. In general, the network 130 may be a telecommunications network and/or a wide area network (WAN). In a particular embodiment, the network 130 includes access to the Internet.

The computer 102 generally includes a processor 104 which obtains instructions and data via a bus 120 from a memory 106 and/or storage 108. The computer 102 may also include one or more network interface devices 118, input devices 122, cameras 123, output devices 124, and microphone 125 connected to the bus 120. The computer 102 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. The output device 124 may include monitors, touch screen displays, and so on.

As shown, the memory 106 contains the predictive failure analysis (PFA) module 112, which is configured to collect data for trend analysis to trigger an alert when resource exhaustion is predicted to occur in a particular job 115 (which may be any program, address space, module, application, or other piece of executable code). In at least one aspect, the PFA module 112 is a job 115 that is executed by a virtual machine 114. In such aspects, PFA 112 executing on a given virtual machine 114 has its own data in the metric data 116 and settings 117. Examples of resources that may be exhausted include the processor 104, memory 106, storage 108, network interface 118, and the like. The PFA module 112 may generally collect any type of data related to a job, such as usage data of a resource, execution time, rates of messages generated by a job, rates of logged data, rates of error records, and the like. In at least one embodiment, the PFA module 112 is a component of an operating system (not pictured).

The PFA module 112 dynamically collects data for jobs 115 that may exhaust a resource over an extended period of time. Therefore, the PFA module 112 generally collects data for jobs 115 that pass both a duration test and a utilization (or usage) test. Jobs 115 that have been executing (or running) for an amount of time that exceeds a threshold amount of time specified in the settings 117 pass the duration test. Similarly, the PFA module 112 may determine that a job 115 passes the utilization test when the job 115 uses a particular resource at a level that exceeds a threshold specified in the settings 117.

In one embodiment, the PFA module 112 may apply different use and duration thresholds, as the case may be, for different types of resources, jobs. For example, the PFA module 112 may collect data on jobs 115 that are determined to be system-related or have started running within a predefined amount of time following system startup (such as one hour since system startup, or initial program load (IPL)). In addition, to address the scenario where a job's utilization "flip flops" above and below the utilization thresholds, the PFA module 112 may apply a second threshold before stopping the collection of data. For example, a general threshold for storage usage in the settings 117 may be 20% of available storage. If job A utilizes 30% of storage (and passes the applicable duration test), the PFA module 112 may collect metric data for job A. In addition, the PFA module 112 may continue to collect metric data for job A even if job A's utilization of storage space falls below 20%, but remains above a second threshold, such as 10% (or half of the general threshold). Therefore, the PFA module 112 may collect metric data for job A until job A's utilization of storage falls below 10% of available storage (and therefore may be insignificant). Doing so may eliminate odd gaps in the collected data, which may skew trend analysis performed by the PFA module 112.

Although shown as part of a virtualized system where a hypervisor 113 manages a plurality of virtual machines 114 executing a respective plurality of jobs 115, the PFA module 112 may execute on any type of computing system. In such a virtualized system, the hypervisor 113 may allocate six different types of virtual storage (corresponding to the memory 106) to a given job 115 executing on a virtual machine 114. A virtual machine 114 (also referred to as a logical partition) is an emulation of a particular computer system. The virtual storage types in the memory 106 may include a user region, an authorized area, an extended user region, and an extended authorized area, a private area consisting of the user region and the authorized area, and an extended private area consisting of the extended user region and the extended authorized area. The PFA module 112 may apply the utilization and duration tests to these areas individually and/or in combination. For example, some virtual storage locations are related such that heavy usage of one of the areas can cause resource exhaustion in another area. Therefore, embodiments disclosed herein collect usage combined usage data for these related virtual storage areas when a job 115 has a combined utilization of the related virtual storage areas that exceeds a combined utilization threshold in the settings 117. Therefore, the PFA module 112 may collect usage data for each individual virtual storage area and each combined virtual storage area once the duration test is passed. Since data for storage locations are collected on an as-needed basis, the PFA module 112 may reduce the amount of time and storage traditionally required to collect data for predictive analysis.

As shown, the storage 108 includes metric data 116 and settings 117. The metric data 116 may be any type of data collected by the PFA module 112, such as resource utilization levels and the like. The settings 117 may include a plurality of rules, thresholds, job types (such as system-related jobs) and other settings used by the PFA module 112 in determining whether to collect data from a job 115. For example, the settings 117 may specify utilization thresholds, duration thresholds, and other rules (which may allow the PFA module 112 to dynamically collect data related to the jobs 115. In addition, the settings 117 may specify jobs 115 that are specifically excluded or included from data collection by the PFA module 112, regardless of usage and duration requirements. For example, a user may suspect that job X is causing issues on a system. Therefore, the settings 117 may indicate the PFA module 112 should collect data regarding job X at all times (or at specific times). Similarly, if the user suspects that job Y provides false positive indications of system failures, the user may specify a rule in the settings 117 that indicates the PFA module 112 should not collect data for job Y at any time.

Figure 2:
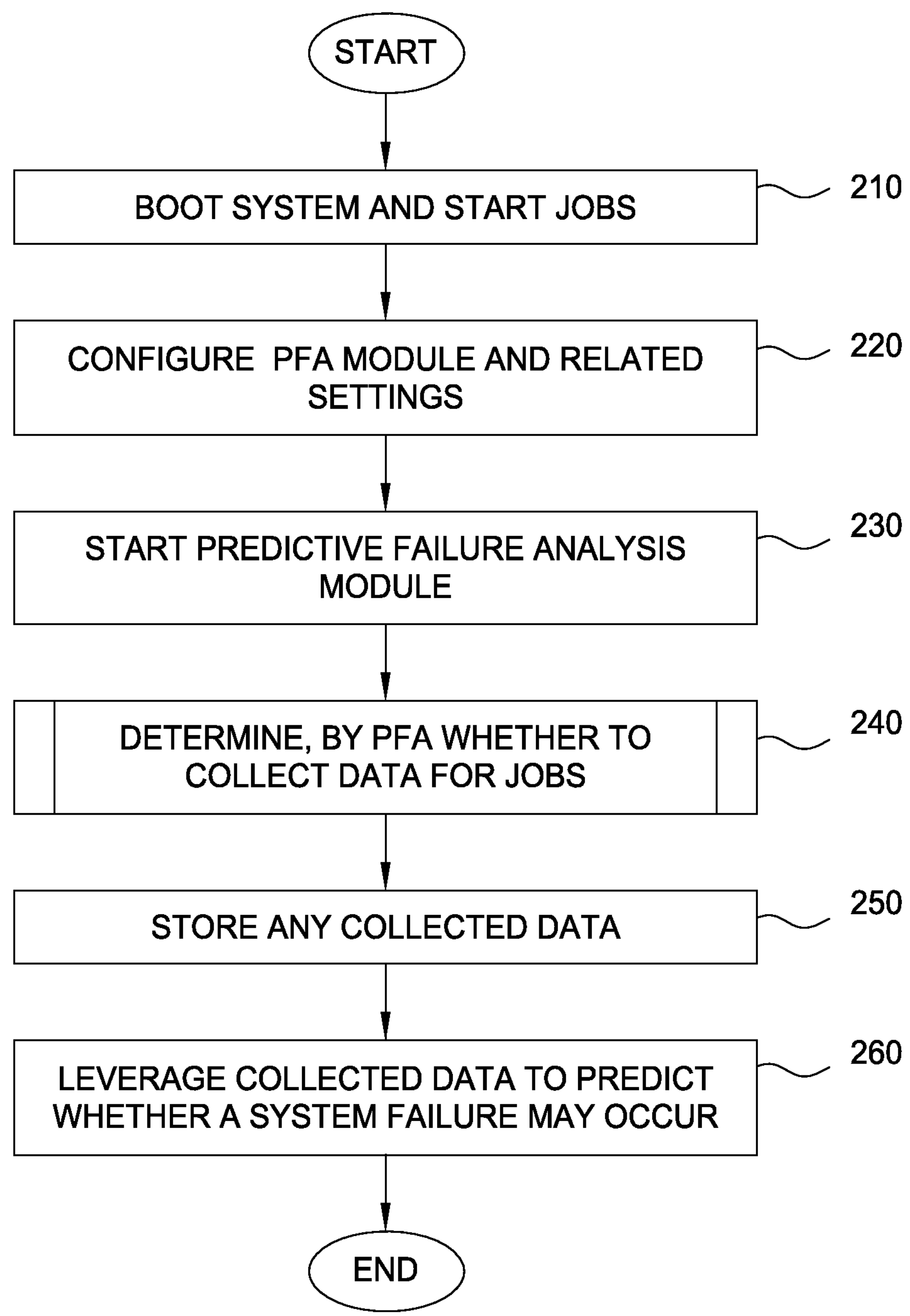
FIG. 2 illustrates a method to dynamically choose data for data collection, according to one embodiment.

FIG. 2 illustrates a method 200 to dynamically choose data for data collection, according to one embodiment. Generally, the steps of the method 200 configure the PFA module 112 to collect data based on a job's duration and resource utilization. The method begins at step 210, where a computing system is booted and jobs begin executing on the system. At step 220, a user may optionally configure the PFA module 112 and related settings. For example, the user may define job inclusions, job exclusions, utilization thresholds for different jobs and/or different resource types, and duration thresholds. At step 230, the PFA module 112 begins executing. If the user does not configure the PFA module 114 and/or the related settings, the PFA module 112 may execute with default settings. At step 240, described in greater detail with reference to FIG. 3, the PFA module 112 determines whether to collect data for jobs 115 executing on the computer 102. Generally (with some exceptions), the PFA module 112 may collect data for jobs that pass both the duration test and the resource utilization test. At step 260, the PFA module 112 may store the data collected from the jobs as part of the metric data 116. At step 260, the PFA module 112 may perform trend analysis to predict whether an error is expected to occur on the computing system at a specific future time. Similarly, the PFA module 112 may perform analysis to determine what the expected value should be for a rate or metric to determine whether an error is occurring on the system at this point in time.

Figure 3:
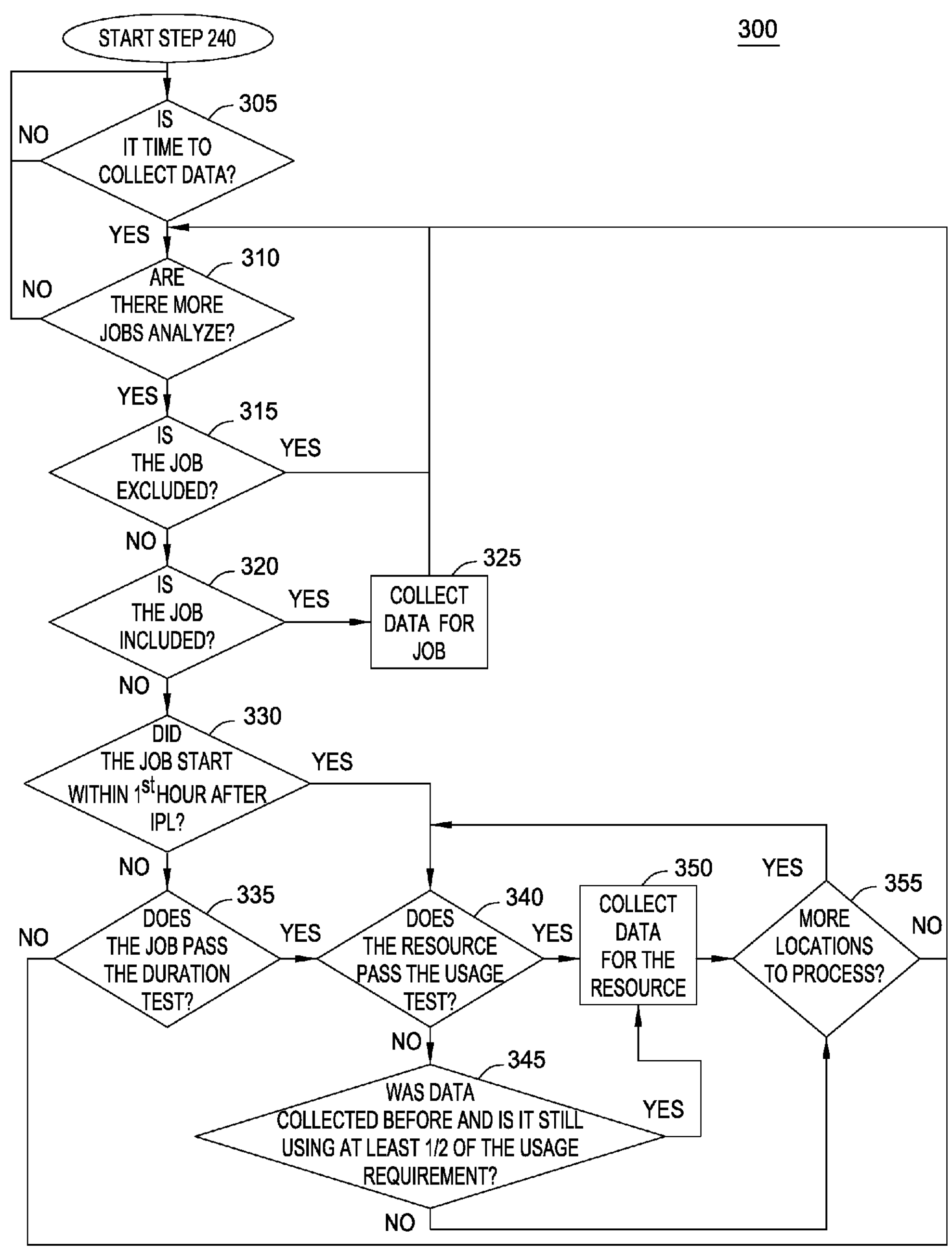
FIG. 3 illustrates a method to determine whether to collect data, according to one embodiment.

FIG. 3 illustrates a method 300 to determine whether to collect data from a given job, according to one embodiment. As shown, the method 300 begins at step 305, where the PFA module 112 determines whether to collect data. For example, settings 117 may specify a minimum duration of post-startup time before the PFA module 112 begins collecting data (such as 1 hour after system start). If the PFA module 112 determines it is not time to collect data, the method returns to step 305. If the PFA module 112 determines it is time to start collecting data, then at step 310, the PFA module 112 determines whether jobs are candidates for data collection. If no jobs need to be analyzed, the method returns to step 305. Otherwise, if a job needs to be analyzed, then at step 315 the PFA module 112 determines whether the candidate job has been excluded from data collection. For example, settings 117 may indicate that job X should be excluded from data collection by the PFA module 112. If the job is excluded, method 300 returns to step 310. If the job is not excluded, then at step 320 the PFA module 112 determines whether the job is included in data collection. For example, settings 117 may indicate that the PFA module 112 should collect data for job Y. If the PFA module 112 determines that the job is included, the PFA module 112 collects data for the job (step 325). If the PFA module 112 determines that the job is not included, the PFA module 112 may determine whether to dynamically collect data for the job.

To do so, at step 330, the PFA module 112 determines whether the current job started within a threshold time (such as one hour) after initial program load (IPL, or more generally, system startup). If so, the method proceeds to step 340, where the PFA module 112 determines if the job passes the usage test for a system resource. If the job passes the usage test, the PFA module 112 collects data for the job (as the job is presumed to be a system related job). If the job did not start within the threshold amount of time, the PFA module 112 determines whether the current job passes the duration test. Stated differently, the PFA module 112 may determine, at step 335, whether the current job has been running for a period of time that exceeds a threshold amount of time. The threshold may be a time threshold for all jobs, a time threshold specific to the job, or a class of jobs. If the job does not pass the duration test, the PFA module 112 does not collect data for the job. If the job passes the duration test, the PFA module 112 determines whether the job passes the usage test for a system resource (step 340). Stated differently, the PFA module 112 may determine whether the job is using a resource at a level which exceeds a resource utilization threshold. If the job passes the resource usage test (and the duration test), the PFA module 112 collects data at step 350. If the job does not pass the resource usage test, the PFA module 112 further evaluates the job at step 345 prior to deciding whether to collect data.

At step 345, the PFA module 112 may determine whether data was previously collected for the job, and the job is still using at least one half of the usage requirement (or threshold). For example, a usage requirement for processor usage in the settings 117 may be 50%. If the current job was previously utilizing 75% of the processor (and passed the duration test, or is a system-related job), the PFA module 112 would have previously collected data for the job. Therefore, at step 345, the PFA module 112 determines whether the job is currently using more than 25% of the processor resources (i.e., one half of the 50% utilization threshold). If the job is using less than 25% of processor resources, the PFA module 112 may determine to not collect any more data for the current job. If, however, the job is using more than one half of the usage threshold (e.g., more than 25% of processor resources), the PFA module 112 may proceed to step 350. At step 350, the PFA module 112 may begin collecting resource utilization data for the job. The PFA module 112 may collect any type of data for use in trend analysis to analyze system performance and/or predict system failures. The data may be for any type of resource. The PFA module 112 may then proceed to step 355, where the PFA module 112 determines whether any resources remain. If more resources remain (such as different resource types, or combined resources), the PFA module 112 returns to step 340. If no resources remain (i.e., the PFA module 112 has analyzed the current job's utilization of each type of system resource), the PFA module 112 returns to step 310.

Advantageously, embodiments disclosed herein limit the amount of data collected by a system monitor to those jobs (or a subset of jobs) that pass both a time duration test and a resource utilization test. Embodiments disclosed herein collect data only for those jobs, such as operating system and middleware-like jobs, that may exhaust system resources over an extended period of time, rather than collecting data for rogue applications that exhaust resources quickly, or are transient in nature. Doing so reduces the amount of time and system resources spent in collecting data for trend analysis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the PFA module 112 could execute on a computing system in the cloud and dynamically collect data from jobs 115. In such a case, the PFA module 112 could store the collected data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:

one or more processors; and a memory containing a program which when executed by the processors performs an operation for dynamically limiting collection of metric data, the operation comprising:

collecting, metric data for a first job upon determining that the first job:

began executing within a threshold amount of time of an initial program load of the system, wherein the first job manages an aspect of the system;

uses the memory at a level that exceeds a first combined memory threshold, wherein the first job is allocated each of a plurality of portions of the memory, wherein the first combined memory threshold applies to use of at least two of the plurality of portions of the memory;

uses a first resource of the system at a level that exceeds a first threshold, wherein the metric data describes a usage level of the memory and a usage level of the first resource by the first job, wherein the first resource is different than the memory; and has been executing for a duration of time that exceeds a time threshold; and stopping the collecting of metric data for the first job upon determining at least one of: (i) that the level of use of the memory falls below the first combined memory threshold, and (ii) the level of use of the first resource falls below the first threshold, wherein the collecting of the metric data causes the computing system to collect less metric data relative to collecting metric data without considering the combined threshold, the first threshold, and the time threshold.

2. The system of claim 1, the operation further comprising subsequent to determining that the first job has been executing for the duration of time that exceeds the time threshold:

collecting, metric data for the first job upon further determining that the utilization level of the first job reduces to a second level of utilization, wherein the second level of utilization is less than the first threshold and greater than a second threshold.

3. The system of claim 2, the operation further comprising stopping the collection of metric data for the first job upon determining that the second level of utilization is less than the second threshold.

4. The system of claim 1, the operation further comprising not collecting metric data for a second job, upon determining at least one of:

that the second job has not been executing for a duration of time that exceeds the time threshold;

that the second job has been predefined to be excluded from collection of metric data; and that the second job does not utilize any resource of the system at a utilization level that exceeds a utilization threshold for the respective resource.

5. The system of claim 1, wherein the plurality of portions of the memory comprise: (i) a user region of the memory, (ii) an authorized area of the memory, (iii) an extended user region of the memory, and (iv) an extended authorized area of the memory, wherein the metric data for the first job is collected upon further determining that the first job has utilized the at least two of the plurality of portions of the memory for a duration of time that exceeds the time threshold.

6. The system of claim 1, wherein the collected metric data is used to predict a failure within the system, wherein the first resource comprises at least one of: (i) a storage, (ii) a processor, (iii) a network adapter, (iv) a file system, (v) a rate of messages generated by the first job, (vi) a rate of data logged by the first job, and (vii) a rate of error records created by the first job.

7. The system of claim 1, the operation further comprising subsequent to determining that the first job has been executing for the duration of time that exceeds the time threshold:

collecting, metric data for the first job upon further determining that the level of use of the plurality of portions of the memory reduces to a second level of utilization, wherein the second level of utilization is less than the first combined memory threshold and greater than a second combined memory threshold.

8. The system of claim 7, the operation further comprising stopping the collection of metric data for the first job upon determining that the second level of utilization is less than the second combined memory threshold.

9. The system of claim 8, wherein the plurality of portions of the memory comprise: (i) a user region of the memory, (ii) an authorized area of the memory, (iii) an extended user region of the memory, and (iv) an extended authorized area of the memory, wherein the metric data for the first job is collected upon further determining that the first job has utilized the at least two of the plurality of portions of the memory for a duration of time that exceeds the time threshold.

10. The system of claim 9, wherein the collected metric data is used to predict a failure within the system, wherein the first resource comprises at least one of: (i) a storage, (ii) a processor, (iii) a network adapter, (iv) a file system, (v) a rate of messages generated by the first job, (vi) a rate of data logged by the first job, and (vii) a rate of error records created by the first job.

11. A computer program product comprising:

a computer-readable storage medium having computer-readable program code embodied therewith, the computer-readable program code executable by a computer processor to perform an operation for dynamically limiting collection of metric data, the operation comprising:

collecting, metric data for a first job upon determining that the first job:

began executing within a threshold amount of time of an initial program load of a computing system, wherein the first job manages an aspect of the computing system;

uses a memory of the computing system at a level that exceeds a first combined memory threshold, wherein the first job is allocated each of a plurality of portions of the memory, wherein the first combined memory threshold applies to use of at least two of the plurality of portions of the memory;

uses a first resource of the computing system at a level that exceeds a first threshold, wherein the metric data describes a usage level of the memory and a usage level of the first resource by the first job; and has been executing for a duration of time that exceeds a time threshold; and stopping the collecting of metric data for the first job upon determining at least one of: (i) that the level of use of the memory falls below the first combined memory threshold, and (ii) the level of use of the first resource falls below the first threshold, wherein the collecting of the metric data causes the computing system to collect less metric data relative to collecting metric data without considering the combined threshold, the first threshold, and the time threshold.

12. The computer program product of claim 11, the operation further comprising subsequent to determining that the first job has been executing for the duration of time that exceeds the time threshold:

collecting, metric data for the first job upon further determining that the utilization level of the first job reduces to a second level of utilization, wherein the second level of utilization is less than the first threshold and greater than a second threshold.

13. The computer program product of claim 12, the operation further comprising stopping the collection of metric data for the first job upon determining that the second level of utilization is less than the second threshold.

14. The computer program product of claim 11, wherein the plurality of portions of the memory comprise: (i) a user region of the memory, (ii) an authorized area of the memory, (iii) an extended user region of the memory, and (iv) an extended authorized area of the memory, wherein the metric data for the first job is collected upon further determining that the first job has utilized the at least two of the plurality of portions of the memory for a duration of time that exceeds the time threshold, wherein the collected metric data is used to predict a failure within the computing system.

15. The computer program product of claim 11, the operation further comprising not collecting metric data for a second job, upon determining at least one of:

that the second job has not been executing for a duration of time that exceeds the time threshold;

that the second job has been predefined to be excluded from collection of metric data; and that the second job does not utilize any resource of the computing system at a utilization level that exceeds a utilization threshold for the respective resource.

* * * * *